US008110783B2

(12) United States Patent
Sasaki et al.

(10) Patent No.: US 8,110,783 B2
(45) Date of Patent: Feb. 7, 2012

(54) TUBULAR HEATER

(75) Inventors: Takashi Sasaki, Wako (JP); Akihiro Suzuki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 804 days.

(21) Appl. No.: 12/186,144

(22) Filed: Aug. 5, 2008

(65) Prior Publication Data

US 2009/0039074 A1 Feb. 12, 2009

(30) Foreign Application Priority Data

Aug. 6, 2007 (JP) ................................ 2007-204466

(51) Int. Cl.
*H05B 3/44* (2006.01)
*G01N 25/00* (2006.01)

(52) U.S. Cl. ........ 219/544; 219/538; 219/539; 219/541; 219/546; 219/548; 73/25.05; 73/25.03

(58) Field of Classification Search .............. 219/538–9, 219/541, 543–3, 546, 548; 73/25.05, 25.03
See application file for complete search history.

(56) References Cited

U.S. PATENT DOCUMENTS 7,360,395 B2 * 4/2008 Sasaki et al. ................ 73/25.05

FOREIGN PATENT DOCUMENTS

| | | | |
|---|---|---|---|
| JP | 11-097156 | A | 4/1999 |
| JP | 2005-332628 | * | 12/2005 |
| JP | 2005-332628 | A | 12/2005 |
| JP | 2006-349513 | A | 12/2006 |

* cited by examiner

*Primary Examiner* — Shawntina Fuqua
(74) *Attorney, Agent, or Firm* — Westerman, Hattori, Daniels & Adrian, LLP

(57) ABSTRACT

A tubular heater includes a continuous heat-generating resistance element formed in a predetermined pattern on one surface of a tubular insulating substrate, and first and second lead wires connected opposite ends of the heat-generating resistance element and extending from one end of the tubular insulating substrate in a common axial direction of the tubular insulating substrate. The first and second lead wires are disposed in diametrically opposed relation to each other about a central axis of the tubular insulating substrate.

10 Claims, 7 Drawing Sheets

TUBULAR HEATER

FIELD OF THE INVENTION

The present invention relates to a tubular heater designed to generate heat when energized via lead wires.

BACKGROUND OF THE INVENTION

Heater may take various shapes depending on the shape of an object to be heated by the heater. A tubular shaped heater is disclosed in, for example, Japanese Patent Application Laid-Open Publication (JP-A) No. 2006-349513, and a plate-like heater is disclosed in, for example, Japanese Patent Application Laid-Open Publication (JP-A) No. 2005-332628.

The tubular heater disclosed in JP 2006-349513A, owned by the present assignee, as shown in FIG. 7 hereof, includes a tubular body 201 forming a ceramic heater incorporated in a gas sensor 202. When energized via conducting wires 203, 203, the ceramic heater 201 generates heat to thereby prevent dew condensation from occurring in a detection chamber of the gas sensor 202. In FIG. 7, the conducting wires 203, 203 are shown as if they are disposed in opposed relation to each other. However, this is only for purposes of illustration. In reality, the conducting wires 203, 203 are disposed side by side or in lateral juxtaposition on one radial side of a central axis of the tubular ceramic heater 201.

The thus arranged ceramic heater 201 is not fully satisfactory in that the temperature in the vicinity of the two juxtaposed conducing wires 203, 203 is relatively low, while the temperature at a portion diametrically opposed to the two juxtaposed conducting wires 203, 203 is relatively high. Thus the prior ceramic heater 201 cannot generate heat with a uniform temperature distribution. Furthermore, the conducting wires 203, 203 are disposed side by side and, hence, they are likely to cause a short circuit during manufacture or assembly of the ceramic heater 201.

FIG. 8 hereof shows a thermosensor 221 disclosed in JP 2005-332628A. The thermosensor 221 includes a rectangular printed-circuit board 222 on which a resistance pattern 223 and a connection pattern 224 are formed by printing. Core wires 225 are connected to the connection pattern 224. The connection pattern 224 facilitates easy connection of the core wires 225 to the thermosensor 221. The resistance pattern 223 can be used as a resistance pattern of a heater in which instance the core wires 225 are connected directly to the resistance pattern 223.

When the heater having the resistance pattern 223 is energized via the core wires 225, the temperature of the resistance pattern 223 is relatively high at a central portion thereof and relatively low in the vicinity of the core wires 225. Thus, regional temperature variations of the conventional heater are relatively large.

SUMMARY OF THE INVENTION

With the foregoing drawbacks of the prior art in view, an object of the present invention is to provide a tubular heater which is able to generate heat with less temperature variations and free of a short circuit between lead wires.

According to the present invention, there is provided a tubular heater comprising a tubular insulating substrate, a continuous heat-generating resistance element formed in a predetermined pattern on one surface of the insulating substrate, and a first lead wire connected to one end of the heat-generating resistance element and a second lead wire connected to an opposite end of the heat-generating resistance element, the first and second lead wires extending from one end of the tubular insulating substrate in a common axial direction of the tubular insulating substrate. The first and second lead wires are disposed in diametrically opposed relation to each other about a central axis of the tubular insulating substrate.

With this arrangement, since the first and second lead wires, which constitute non-heat-generating portions and tend to lower the temperature, are disposed in diametrically opposed relation about the central axis of the tubular insulating substrate, it is possible to reduce the regional temperature variations to an greater extent as compared to a convention tubular heater in which two lead wires are arranged side by side or in lateral juxtaposition on one radial side of the central axis of the tubular heater.

Furthermore, the first and second lead wires, which are disposed in diametrically opposed relation to each other about the central axis of the tubular insulating substrate is substantially free from a short circuit.

Preferably, when viewed in a development view, the pattern of the heat-generating resistance element is arranged such that the heat-generating resistance element runs from one of the first and second lead wires in a direction away from the other of the first and second lead wires and returns to the other of the first and second lead wires.

In one preferred form of the present invention, the heat-generating resistance element has a first meandering portion extending from the first lead wire toward the second lead wire, a second meandering portion extending from the second lead wire in a direction away from the first lead wire, and a linear connecting portion extending between ends of the first and second meandering portions which are located remote from the first and second lead wires, respectively. With this arrangement, the heat-generating resistance element is able to provide heating with a highly uniform temperature distribution.

In another preferred form of the present invention, the heat-generating resistance element has a first meandering portion extending from the first lead wire in an axial direction of the tubular insulating substrate, and a second meandering portion extending from the second lead wire in the axial direction of the tubular insulating substrate. The first and second meandering portions are disposed side by side in a circumferential direction of the tubular insulating substrate with respective one of the first and second lead wires disposed therebetween. By thus arranging the heat-generating resistance element, heating with less regional temperature variations can be achieved. One of the first and second meandering portions may include a meandering section extending in the circumferential direction of the tubular insulating substrate.

In still another preferred form of the present invention, the heat-generating resistance element has a series meandering portions arranged in a circumferential direction of the tubular insulating element and extending in an axial direction of the tubular insulating substrate. One endmost meandering portion is connected to the first lead wire, and another endmost meandering portion is connected to the second lead wire. The second lead wire is disposed between two adjacent ones of the meandering portions which are disposed between said two endmost meandering portions. The thus arranged heat-generating resistance element is also able to achieve heating with a highly uniform temperature distribution.

Preferably, the heat-generating resistance element is formed on an inner peripheral surface of the tubular insulating substrate, and the first and second lead wires are disposed on the inner peripheral surface of the tubular insulating substrate. By thus mounting the heat-generating resistance element and the first and second lead wires on the inner peripheral surface of the tubular insulating substrate, the tubular heater is allowed to have a circular cylindrical outer surface without projection, which is particularly advantageous when the heater is incorporated in a gas sensor. Furthermore, the lead wires disposed on the inner peripheral surface of the tubular insulating substrate does not increase an outside diameter of the tubular insulating substrate.

In one preferred form of the present invention, the tubular heater includes a dehumidifying agent incorporated therein. The tubular heater having such built-in dehumidifying agent is particularly useful when assembled in a gas sensor such as hydrogen sensor.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1A:
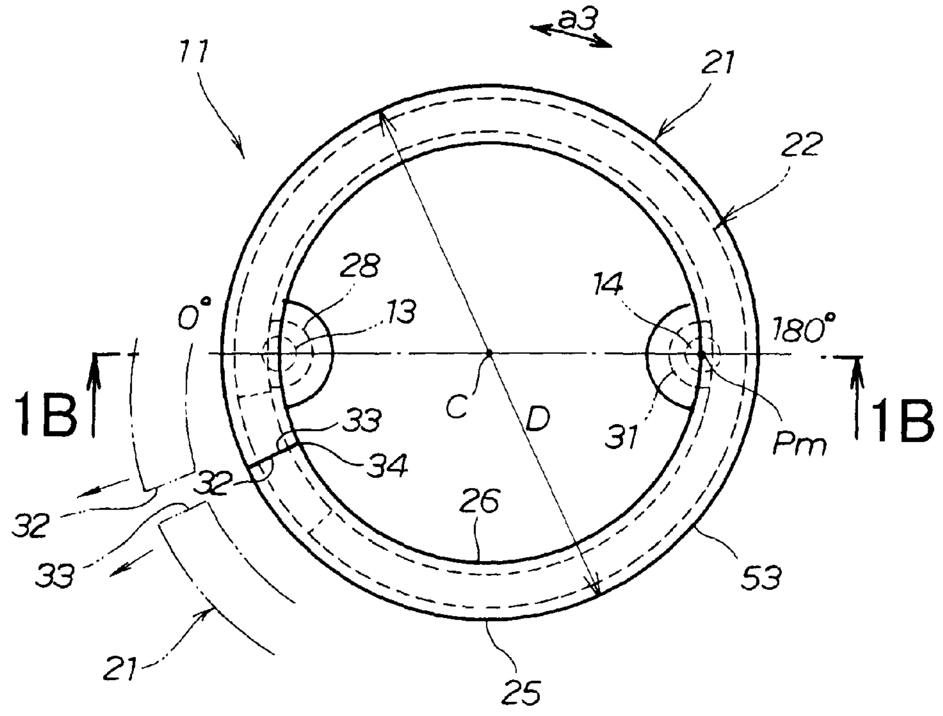
FIG. 1A is a plan view of a tubular heater according to a first embodiment of the present invention.
Figure 1B:
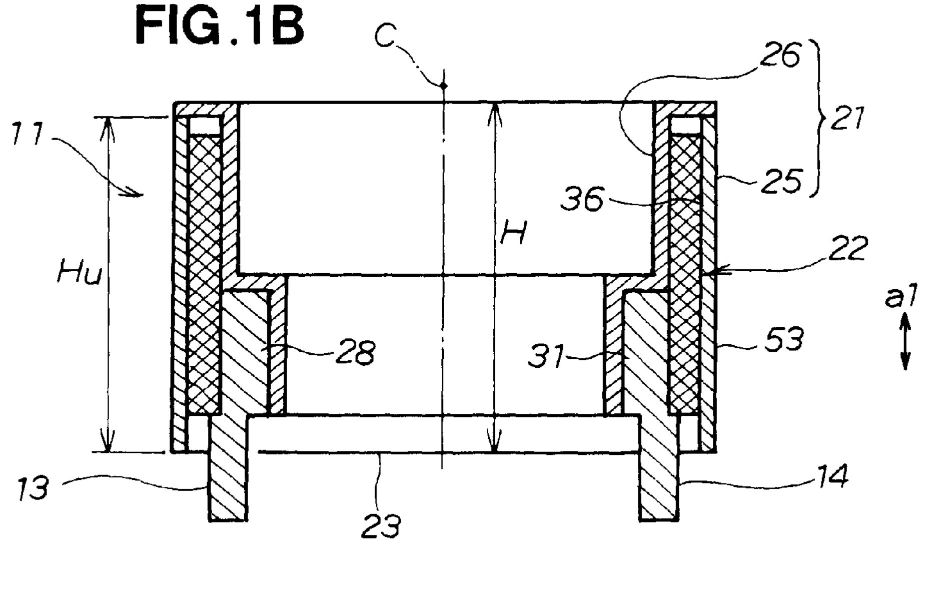
FIG. 1B is a cross-sectional view taken along line 1B-1B of FIG. 1A.
Figure 2:
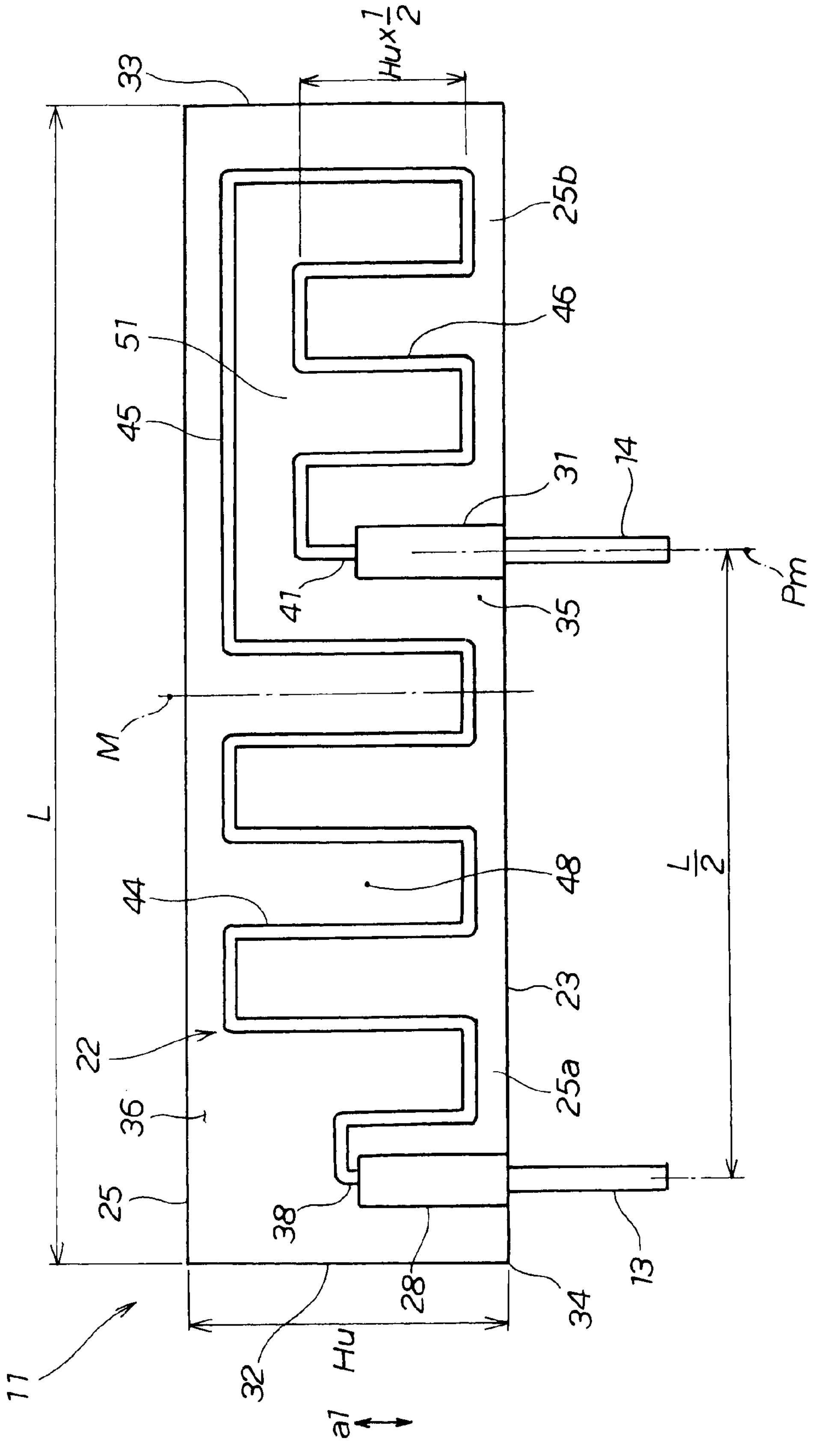
FIG. 2 is a development view showing a pattern of a heat-generating resistance element of the tubular heater.

Referring now to the drawings and FIGS. 1 and 2 in particular, there is shown a tubular heater 11 according to a first embodiment of the present invention. The tubular heater 11 is designed to heat a tubular object and develop heat when energized via two lead wires 13, 14.

More particularly, the tubular heater 11 generally comprises an insulating tube 21 having a predetermined outside diameter D (FIG. 1A) and a predetermined axial length H (FIG. 1B), a continuous heat-generating resistance element 22 contained in the insulating tube 21, and the lead wires 13, 14 connected to opposite ends of the heat-generating resistance element 22 and drawn from one end of the insulating tube 21 in a common axial direction (as indicated by a double-headed arrow shown in FIG. 1B). The lead wires 13, 14 are disposed in diametrically opposed relation to each other about a central axis C of the insulating tube 21. In other words, the lead wires 13, 14 are spaced in a circumferential direction (indicated by the double-headed arrow shown in FIG. 1A) of the insulating tube 22 by an angle of 180-degrees.

The insulating tube 21 is composed of an outer insulating member 25 and an inner insulating member 26, which are so configured as to jointly accommodate the heat-generating resistance element 22 and cover joint portions 28, 31 of the respective lead wires 13, 14 connected to the opposite ends of the heat-generating resistance element 22. The outer insulating member 25 forms a tubular insulating substrate according to the present invention. The outer insulating member (tubular insulating substrate) 25 has an axial length Hu (FIG. 1).

The outer and inner insulating members 25, 26 initially have elongated rectangular sheet-like configurations and after they are assembled together with the heat-generating resistance element 22 and the lead wires 13, 14 held therebetween, the outer and inner insulating members 25, 26 are rolled into a tubular form. By joining mating end edges 32, 33 (FIG. 1*a*) of the tube, the insulating tube 21 is completed. Due to such forming process, the insulating tube 21 has an axial joint portion 34 (FIG. 1A).

FIG. 2 is a development view showing the outer insulating member (tubular insulating substrate) 25 and the heat-generating resistance element 22 formed, for example, by printing on an inner peripheral surface of the outer insulating member (tubular insulating substrate) 25. The heat-generating resistance element 22 has a predetermined pattern. As shown in FIG. 2, when the insulating tube 21 (FIG. 1A) is in a developed state, the outside insulating member (tubular insulating substrate) 25 takes the form of a flat strip-shaped insulating substrate having one end edge (corresponding to one mating end edge 32 of the insulating tube 21) and an opposite end edge (corresponding to the other mating end edge 33 of the insulating tube 21). The strip-shaped insulating substrate 25 has a length L corresponding to a perimeter of the outer insulating member (tubular insulating substrate) 25. The outer insulating member 25 is formed from a resinous material, preferably a highly thermal conductive resin.

As shown in FIG. 2, the first lead wire 13 is disposed adjacent to one end edge 32 of the strip-shaped insulating substrate 25, and the second lead wire 14 is disposed on an intermediate portion between the one end edge 32 and the opposite end edge 33 of the strip-shaped insulating substrate 25. More specifically, the second lead wire 14 is located at a position Pm which is spaced from the first lead wire 13 by a distance equal to one-half of the length L of the strip-shaped insulating substrate 25. The strip-shaped insulating substrate 25 has a first surface region 25 extending between the one end edge 32 and a middle portion M of the strip-shaped insulating substrate 25, and a second surface region 25*b* extending between the middle portion M and the opposite end edge 33 of the strip-shaped insulating substrate 25.

The heat-generating resistance element 22 is formed by printing on one surface 36 of the strip-shaped insulating substrate 25, which is corresponding to the inner peripheral surface 36 (FIG. 1A) of the tubular insulating substrate 25. The heat-generating resistance element 22 has one end 38 connected to the joint portion 28 of the first lead wire 13, and an opposite end 41 connected to the joint portion 31 of the second lead wire 14. The heat-generating resistance element 22 has a pattern extending over the entire area of the surface 36 of the strip-shaped insulating substrate 25 such that the heat-generating resistance element 22 runs from the second lead wire 14 in a direction away from the first lead wire 13 and returns to the first lead wire 13. Stated in other words, the pattern of the heat-generating resistance element 22 is arranged such that the heat-generating resistance element 22 runs from the first lead wire 13 in a direction toward the second lead wire 14, further advances beyond the second lead wire 14, and returns to the second lead wire 14.

More specifically, the heat-generating resistance element 22 has a first meandering portion 44 formed on the first surface region 25*a* of the strip-shaped substrate 25 and extending in a lengthwise direction of the strip-shaped substrate 25 (corresponding to the circumferential direction of the tubular heater 11) between the joint portion 28 of the first lead wire 13 and the middle portion M of the strip-shaped insulating substrate 25, a second meandering portion 46 formed on the second surface region 25*b* and extending in the lengthwise direction of the strip-shaped substrate 25 between the joint portion 31 of the second lead wire 14 and the opposite end edge 33 of the strip-shaped insulating substrate 25, and a linear connecting portion 45 formed on the second surface region 25*b* and extending linearly between ends of the first and second meandering portions 44 and 46 which are located remote from the associated joint portions 28, 31. The first meandering portion 44 has an amplitude approximately equal to the axial length Hu of the outer insulating member (insulating substrate) 25, and the second meandering portion 46 has an amplitude substantially equal to one-half of the axial length Hu of the insulating substrate 25. The linear connecting portion 45 extends linearly between the opposite end edge 33 and the middle portion M of the insulating substrate 25.

The pattern of the heat-generating resistance element 22 is arranged such that a part of the heat-generating resistance element 22 which is formed on the first surface region 25*a* of the strip-shaped insulating substrate 25 is equal in length to a part of the heat-generating resistance element 22 which is formed on the second surface region 25*b* of the strip-shaped insulating substrate 25. In the embodiment shown in FIG. 2, the length of the first meandering portion 44 of the heat-generating resistance element 22 is substantially equal to the sum of the length of the linear connecting portion 45 and the length of the second meandering portion 46 of the heat-generating resistance element 22.

A mechanism to reduce regional temperature variations of the tubular heater 11 will be described below in conjunction with operation of the tubular heater 11 of the foregoing construction. When the tubular heater 11 is energized via the lead wires 13, 14, the heat-generating resistance element 22 generates heat and increases its own temperature. In this instance, since the heat-generating resistance element 22 is arranged in a pattern distributed substantially uniformly over the entire surface (inner peripheral surface) 36 of the tubular insulating substrate 25, regional temperature variations of the tubular heater become small.

The heat-generating resistance element 22 formed by printing on the surface 36 of the insulating substrate 25 generally has a heat-generating characteristic that the temperature becomes high at a portion which is located remote from each lead wire 13, 14. This means that the temperature becomes relatively low at a portion located in the vicinity of each of the lead wires 13, 14. This is because the lead sires 13, 14 and the joint portions 28, 31 thereof do not form a heat-generating element. To deal with this problem, according to the present invention, the first and second lead wires 13, 14 and their joint portions 28, 31 are disposed in diagrammatically opposed relation to each other about the central axis C (FIG. 1A) of the tubular heater 11. By thus spacing the first and second lead wires 13, 14 in a circumferential direction of the tubular heater 11, it is possible to reduce the temperature variations in the circumferential direction of the tubular heater 11.

As understood from FIG. 2, when viewed in a direction from the one end edge 32 toward the opposite end edge of the insulating substrate 25, the heater 11 includes non-heat-generating portions and heat-generating portions arranged alternatively. Stated more specifically, the first lead wire 13 including the joint portion 28, which is located adjacent to the one end edge 32 of the insulating substrate 25, forms a first non-heat-generating portion, and the first meandering portion 44 of the heat-generating resistance element 22, which extends between the first lead wire 13 and the middle portion M of the insulating substrate 25, forms a first heat-generating portion. Similarly, the second lead wire 14 including the joint portion 31, which is located adjacent to the middle portion M of the insulating substrate 25, forms a second non-heat-generating portion, and a combination of the linear connecting portion 45 and the second meandering portion 46, which extends between the middle portion M and the opposite end edge 33 of the insulating substrate 25, forms a second heat-generating portion. Since the first and second lead wires 13, 15 are spaced in the circumferential direction of the tubular heater 11 by an angle of 180-degrees, this arrangement can eliminate local concentration of the non-heat-generating portions (which may occur when the lead wires 13, 14 including their respective joint portions 28, 31 are disposed in lateral juxtaposition on one radial side of the central axis of the tubular heater). By thus arranging the lead wires 13, 14, regional temperature variations or differences of the tubular heater 11 can be reduced.

Furthermore, since the first lead wire 13 disposed adjacent to the one end edge 32 of the insulating substrate 25 is also located near the linear connecting portion 45 and the second meandering portion 46 of the heat-generating resistance element 22, heat from the linear connecting portion 45 and the second meandering portion 46 transfers to the joint portion 28 of the first lead wire 13. As a result, temperature averaging is made between a temperature in the vicinity of the first lead wire 13 and a temperature in a central region 51 defined between the linear connecting portion 45 and the second meandering portion 46, a temperature in the vicinity of the second lead wire 14, and a temperature in a central region 48 defined by the first meandering portion 44. With this temperature averaging, regional temperature variations of the tubular heater 11 can be reduced to a minimum. Furthermore, the insulating substrate (outer insulating member) 25 is formed from a highly thermal conductive resin and hence can efficiently transmit heat from the heat-generating resistance element 22 to an outer circumferential surface 53 (FIGS. 1A and 1B) of the tubular heater 11.

The first and second lead wires 13, 14 are disposed on the inner peripheral surface 36 of the tubular insulating substrate (outer insulating member) 25. This arrangement makes it possible to reduce the outside diameter D of the insulating tube 21. Furthermore, since the first and second lead wires 13 and 14 drawn from one end of the tubular insulating substrate 25 are disposed in diametrically opposed relation to each other about the central axis of the tubular insulating substrate 25, this arrangement can effectively preclude a short circuit between the lead wires 13, 14 which might otherwise occur during manufacture or assembly of the tubular heater 11.

Figure 3A:
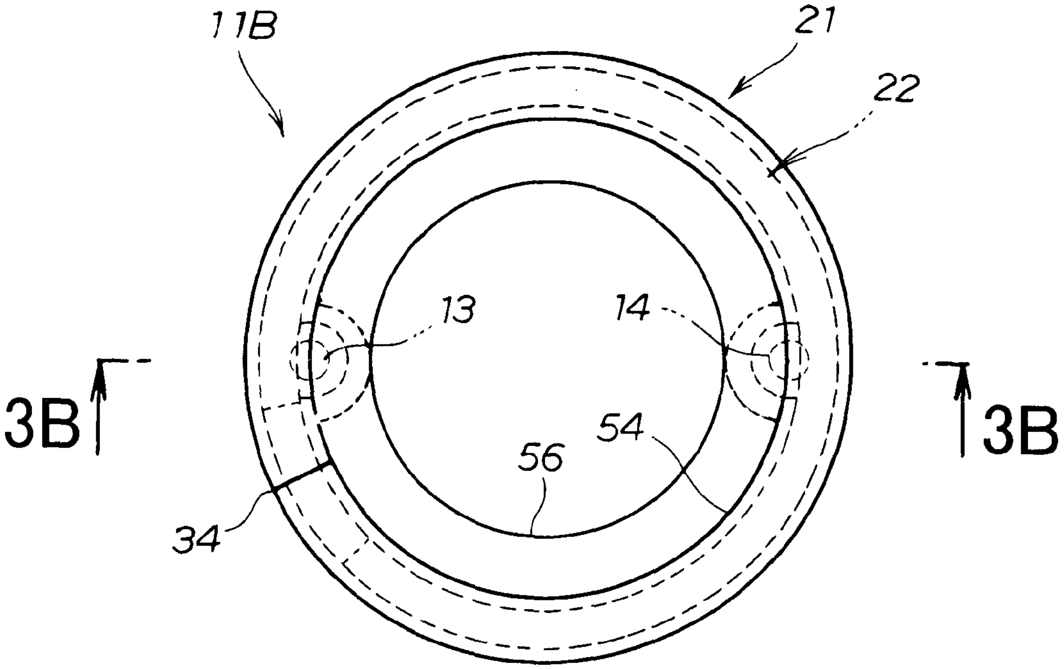
FIG. 3A is a plan view of a tubular heater according to a second embodiment of the present invention.
Figure 3B:
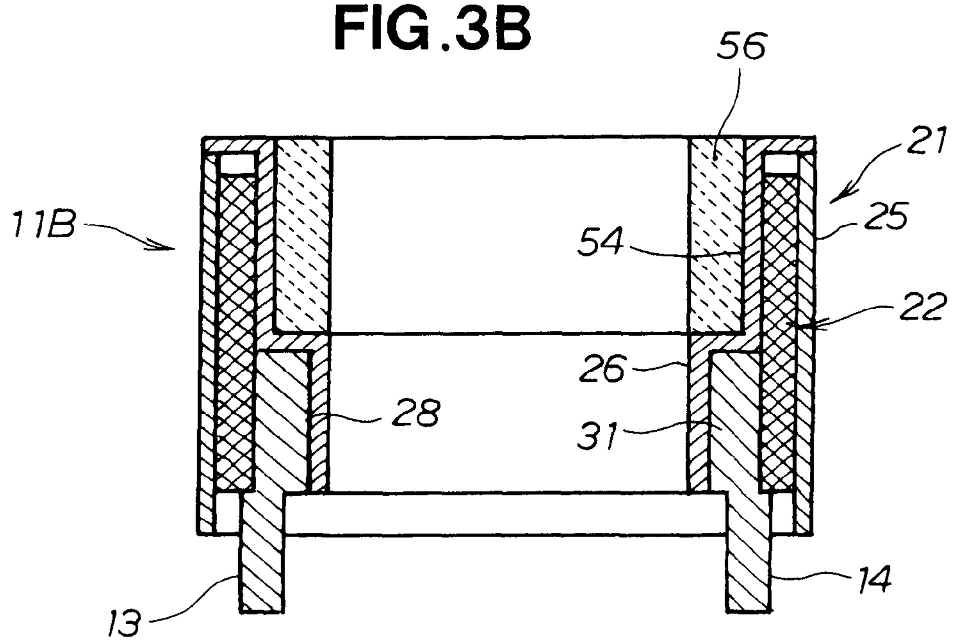
FIG. 3B is a cross-sectional view taken along line 3B-3B of FIG. 3A.

FIGS. 3A and 3B are views similar to FIGS. 1A and 1B, respectively, but showing a tubular heater 11B according to a second embodiment of the present invention. The tubular heater 11B is substantially the same in structure and function as the tubular heater 11 of the first embodiment with the exception that a dehumidifying agent 56 is mounted on an inner circumferential surface of the tubular heater 11B, and the tubular heater 11B is incorporated in a gas sensor 61 shown in FIG. 4. These parts which are similar or corresponding to those described above with reference to the first embodiment shown in FIGS. 1A and 1B are designated by the same reference characters, and further description thereof can be omitted.

Figure 4:
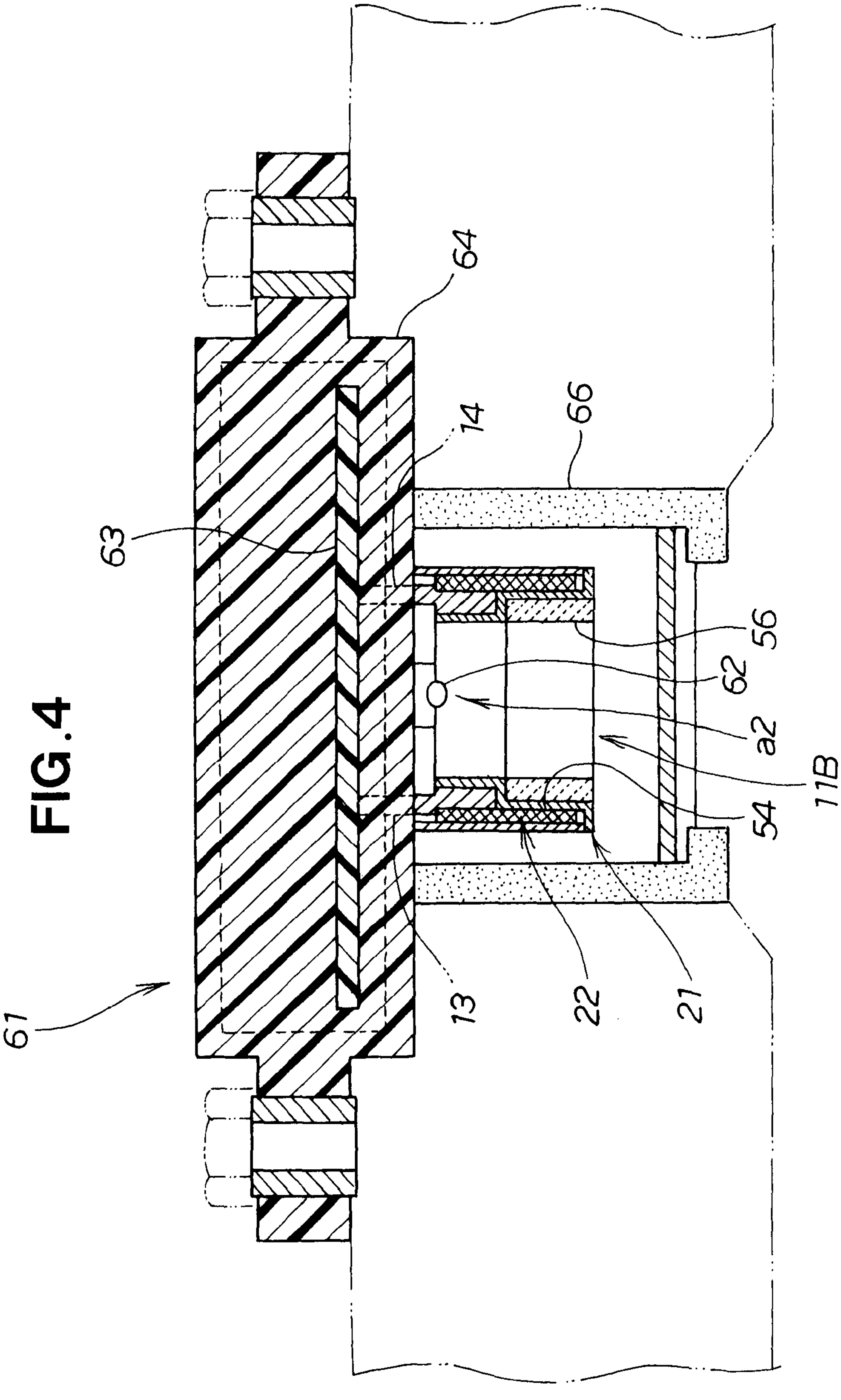
FIG. 4 is a cross-sectional view of a gas sensor in which the tubular heater of the second embodiment is incorporated.

As shown in FIG. 4, the gas sensor 61 is a hydrogen sensor designed to detect hydrogen gas flowing in the direction of arrow a2. The gas sensor 61 includes the tubular heater 11B, a sensor element 62 disposed within a cylindrical detection chamber defined in the tubular heater 11B, a printed circuit board 63 to which the lead wires 11*a*, 14 of the tubular heater 11B are connected, and a case 64 configured to cover the printed circuit board 63 and the tubular heater 11B. The dehumidifying agent 56 mounted on the inner circumferential surface 54 of the tubular heater 11B defines part of the detection chamber and adsorbs fluid or moisture entering the detection chamber.

The tubular heater 11B is provided to heat the detection chamber to thereby keep the detection chamber free from dew condensation. Since the dehumidifying agent 56 is mounted on the circumferential surface 54 of the tubular heater 11B, it is readily possible to control the temperature and hence the moisture adsorbing capacity or power of the dehumidifying agent 56. Furthermore, since the lead wires 13, 14 are disposed on the inner circumferential surface 54 of the insulating tube 21, the insulating tube 21 is allowed to have a circular cylindrical outside surface. This will simplify the configuration of an outer cylindrical portion 66 of the gas sensor 61, ensuring easy attachment of the gas sensor 61 to a vehicle body, for example.

Figure 5:
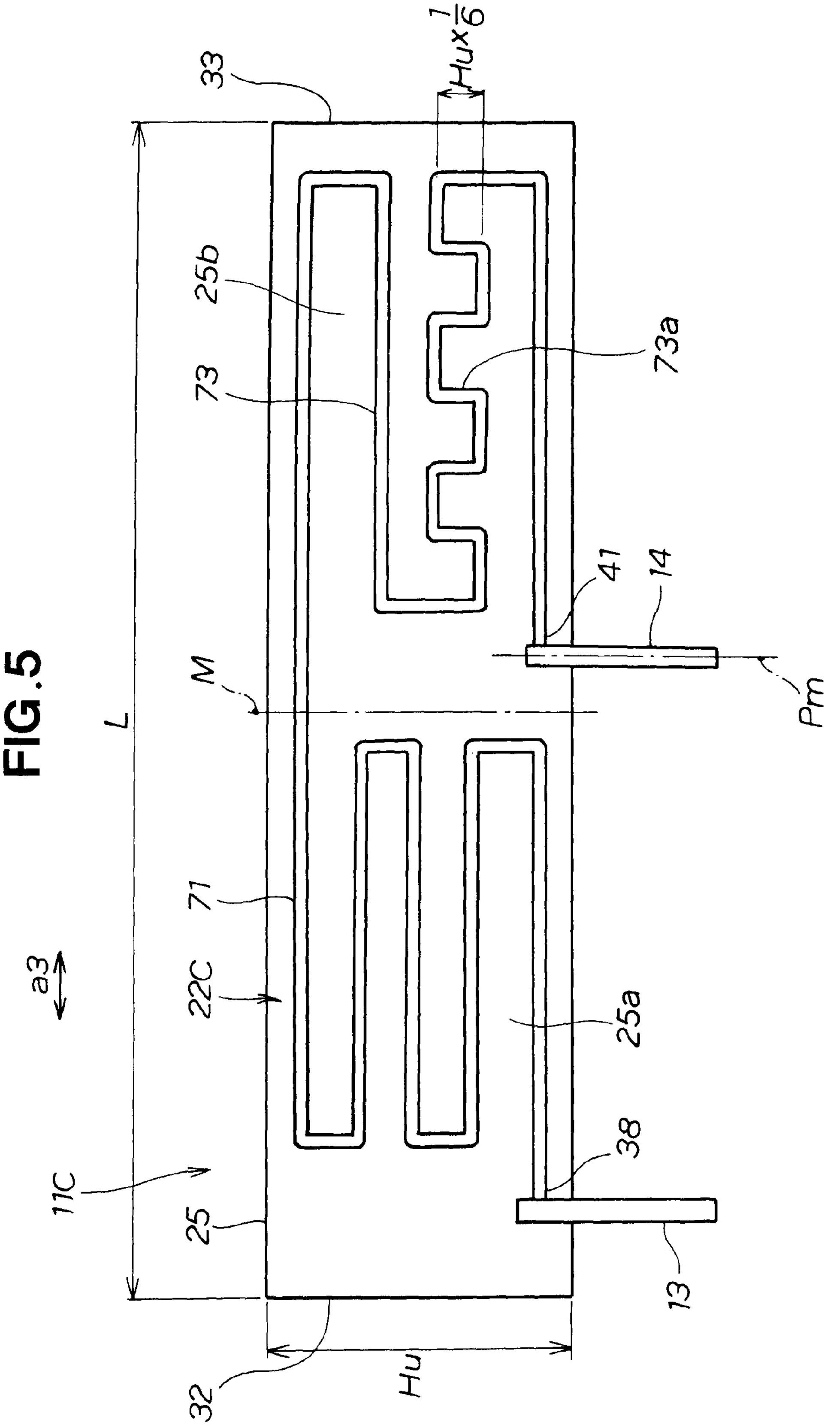
FIG. 5 is a view similar to FIG. 2, but showing a heat-generating resistance element having a different pattern according to a modification of the present invention.

FIG. 5 is a development view similar to FIG. 2, but showing a heat-generating resistance element 22C having a pattern according to a first modification of the present invention. These parts which are similar or corresponding to those described above with reference to FIG. 2 are designated by the same reference characters and no further description is needed. As shown in FIG. 5, the strip-shaped insulating substrate 25 has a first surface region 25*a* extending between one end edge 32 and a middle portion M of the strip-shaped insulating substrate 25, and a second surface region 25*b* extending between the middle portion and the opposite end edge 33 of the strip-shaped insulating substrate 25.

The heat-generating resistance element 22C of a modified tubular heater 11C includes a first meandering portion 71 formed on the first surface region 25*a* of the strip-shaped insulating substrate 25 and extending in a widthwise direction of the strip-shaped insulating substrate 25 (corresponding to the axial direction of the tubular heater 11C) between the first lead wire 13 and the middle portion M of the strip-shaped insulating substrate 25, and a second meandering portion 73 formed on the second surface region 25*b* of the strip-shaped insulating substrate 25 and extending in the widthwise direction of the strip-shaped insulating substrate 25 (corresponding to the axial direction of the tubular heater 11C) between the second lead wire 14 and the middle portion M of the strip-shaped insulating substrate 25. The first and second meandering portions 71, 73 have an amplitude approximately equal to one-half of the length L of the strip-shaped insulating substrate 25. The second meandering portion 73 includes a longitudinally meandering section 73*a* extending in the lengthwise direction of the strip-shaped insulating substrate with an amplitude substantially equal to one-sixth of the width of the strip-shaped insulating substrate 25 (corresponding to the axial length Hu of the tubular insulating substrate 25).

The second lead wire 14 is disposed between the first and second meandering portions 71 and 73. In a rolled or assembled state of the tubular heater 11C, the first lead wire 13 is also disposed between the first and second meandering portions 71, 73. The total length of the heat-generating resistance element 22C is divided into two equal parts at the middle portion M of the strip-shaped insulating substrate 25. This means that the length of the first meandering portion 71 formed on the first surface region 25*a* is equal to the length of the second meandering portion 73 formed on the second surface region 25.

Operation and advantageous effects achieved by the modified tubular heater 11C are substantially the same as those achieved by the tubular heater 11 of the first embodiment, and further description thereof can be omitted.

Figure 6:
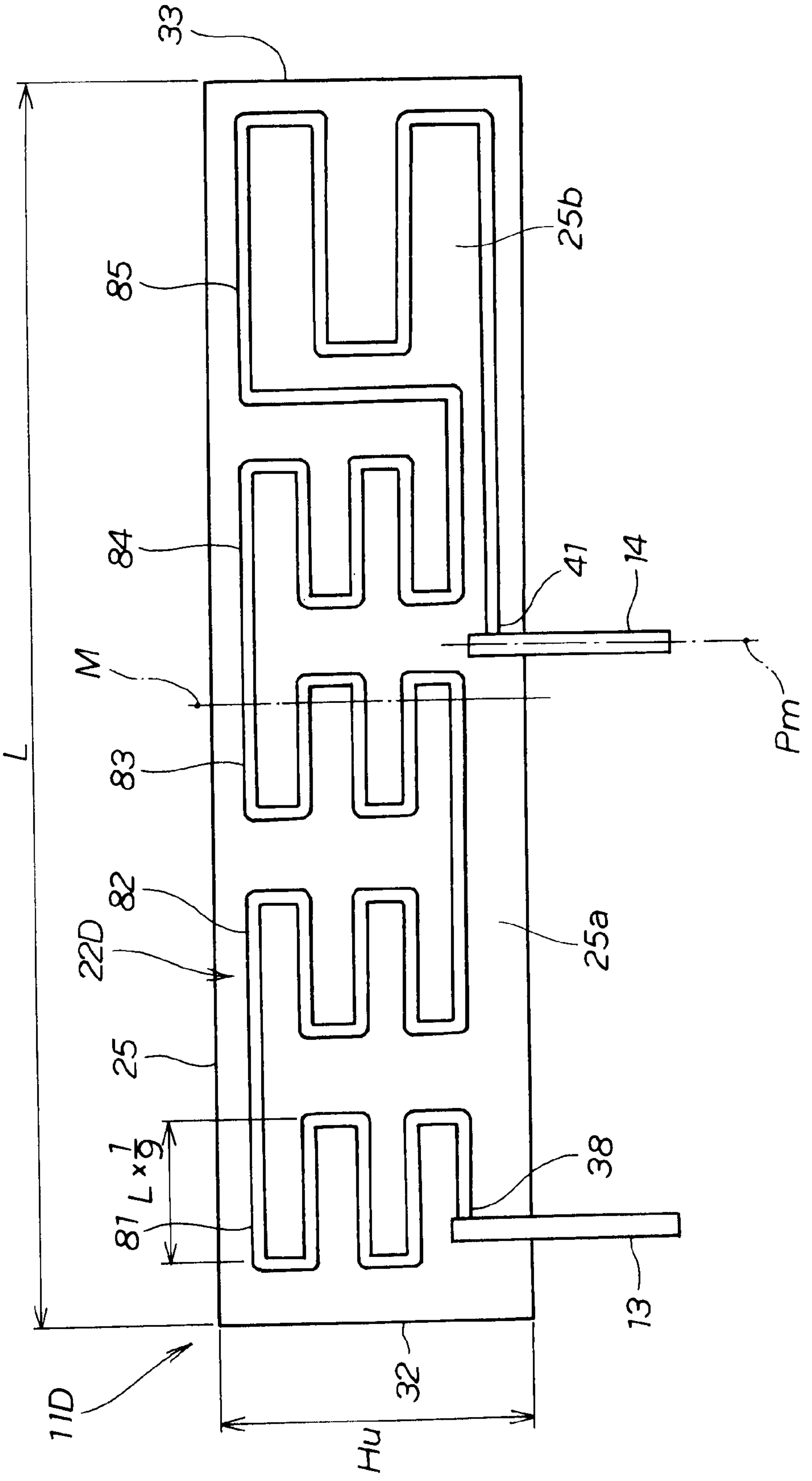
FIG. 6 is a view similar to FIG. 2, but showing a heat-generating resistance element having a different pattern according to another modification of the present invention.
Figure 7:
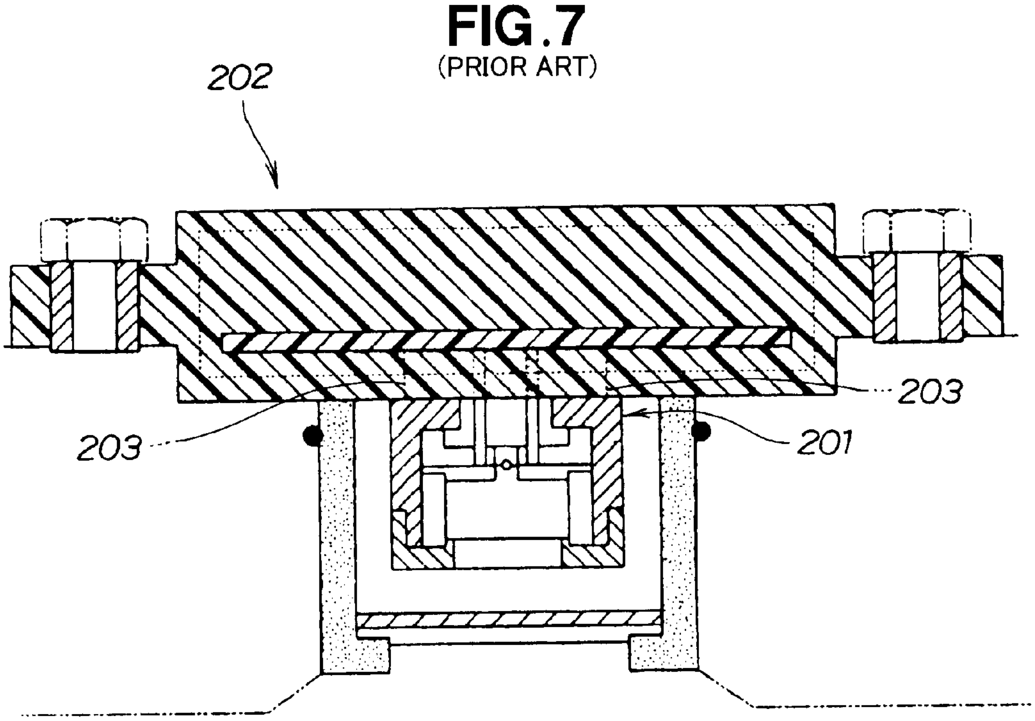
FIG.7 (PRIOR ART)
FIG. 7 is a schematic cross-sectional view of a conventional tubular heater incorporated in a gas sensor.
Figure 8:
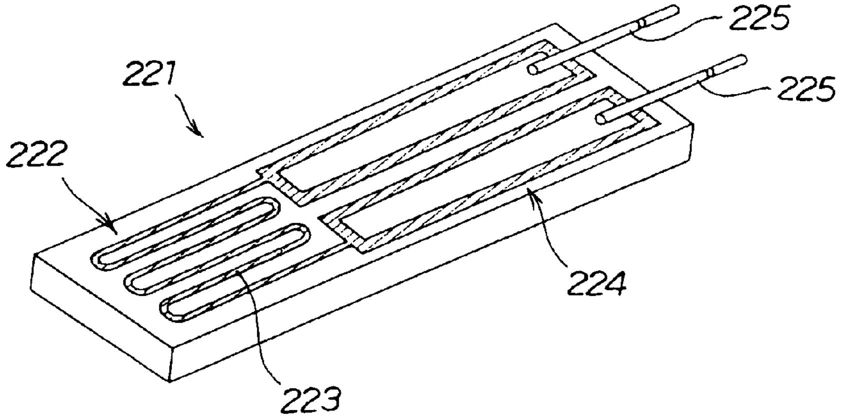
FIG.8 (PRIOR ART)
FIG. 8 is a perspective view of a conventional plate-like heater.

FIG. 6 is a development view similar to FIG. 2, but showing a heat-generating resistance element 22D having a pattern according to a second modification of the present invention. These parts which are similar or corresponding to those described above with reference to FIG. 2 are designated by the same reference characters and no further description is needed. As shown in FIG. 6, the heat-generating resistance element 22D of a modified tubular heater 11D includes a series of meandering portions (five in the illustrated embodiment) 81-85 arranged side by side along the length of a strip-shaped insulating substrate 25 and extending in a widthwise direction of the strip-shaped insulating substrate 25. Each respective meandering portion 81-85 is integrally connected to an adjacent one of the meandering portions 81-85, and the endmost two meandering portions 81 and 85 are connected to a first lead wire 13 and a second lead wire 14, respectively. The second lead wire 14 is disposed between the third and fourth meandering portions 83 and 84 disposed between the two endmost meandering portions 81 and 85.

The first to fourth meandering portions 81-84 have an amplitude nearly equal to one-ninth of the length L of the strip-shaped insulating substrate 25 (corresponding to the perimeter of the tubular insulating substrate 25), and the fifth meandering portion 85 has an amplitude nearly equal to one-sixth part of the length L of the strip-shaped insulating substrate 25. The first and second meandering portions 81 and 82 and a major part of the third meandering portion 83 are formed on the first surface region 25*a* of the strip-shaped insulating substrate 25, while the fourth and fifth meandering portions 84 and 85 and the remaining part of the third meandering portion 83 are formed on the second surface region 25*b* of the strip-shaped insulating substrate 25. The total length of the heat-generating resistance element 22D is halved at the middle portion M of the strip-shaped insulating substrate 25.

Operation and advantageous effects achieved by the modified tubular heater 11D are substantially the same as those achieved by the tubular heater 11 of the first embodiment, and further description thereof can be omitted.

It should be appreciated that the constructions, shapes, positional relationships have been explained above in relation to various examples only to the extent that the present invention can be appropriately understood and carried out, and that the numerical values and materials given above are just illustrative. Namely, the present invention should not be construed as limited to the above-described embodiment and examples and may be modified variously unless it departs from the technical scope indicated by the appended claims.

What is claimed is:

1. A tubular heater comprising:

a tubular insulating substrate;

a continuous heat-generating resistance element formed in a predetermined pattern on one surface of the insulating substrate; and a first lead wire connected to one end of the heat-generating resistance element and a second lead wire connected to an opposite end of the heat-generating resistance element, the first and second lead wires extending from one end of the tubular insulating substrate in a common axial direction of the tubular insulating substrate, wherein the first and second lead wires are disposed in diametrically opposed relation to each other about a central axis of the tubular insulating substrate, wherein when viewed in a development view, the pattern of the heat-generating resistance element is arranged such that the heat-generating resistance element runs from one of the first and second lead wires in a direction way from the other of the first and second lead wires and returns to the other of the first and second lead wire, and wherein the heat-generating resistance element has a first meandering portion extending in a circumferential direction of the tubular insulating substrate from the first lead wire toward the second lead wire, a second meandering portion extending in the circumferential direction of the tubular insulating substrate from the second lead wire in a direction away from the first lead wire, and a linear connecting portion extending in the circumferential direction of the tubular insulating substrate between ends of the first and second meandering portions which are located remote from the first and second lead wires, respectively.

2. A tubular heater comprising:

a tubular insulating substrate;

a continuous heat-generating resistance element formed in a predetermined pattern on one side of the insulating substrate; and a first lead wire connected to one end of the heat-generating resistance element and a second lead wire connected to an opposite end of the heat-generating resistance element, the first and second lead wires extending from one end of the tubular insulating substrate in a common axial direction of the tubular insulating substrate, wherein the first and second lead wires are disposed in diametrically opposed relation to each other about a central axis of the tubular insulating substrate, wherein when viewed in a development view, the pattern of the heat-generating resistance element is arranged such that the heat-generating resistance element runs from one of the first and second lead wires in a direction away from the other of the first and second lead wires and returns to the other of the first and second lead wire, and wherein the heat-generating resistance element has a first meandering portion extending from the first lead wire in an axial direction of the tubular insulating substrate, and a second meandering portion extending from the second lead wire in the axial direction of the tubular insulating substrate, the first and second meandering portions being disposed side by side in a circumferential direction of the tubular insulating substrate with respective one of the first and second lead wires disposed therebetween.

3. The tubular heater of claim 2, wherein one of the first and second meandering portions includes a meandering section extending in the circumferential direction of the tubular insulating substrate.

4. A tubular heater comprising:

a tubular insulating substrate;

a continuous heat-generating resistance element formed in a predetermined pattern on one side of the insulating substrate; and a first lead wire connected to one end of the heat-generating resistance element and a second lead wire connected to an opposite end of the heat-generating resistance element, the first and second lead wires extending from one end of the tubular insulating substrate in a common axial direction of the tubular insulating substrate, wherein the first and second lead wires are disposed in diametrically opposed relation to each other about a central axis of the tubular insulating substrate, wherein when viewed in a development view, the pattern of the heat-generating resistance element is arranged such that the heat-generating resistance element runs from one of the first and second lead wires in a direction away from the other of the first and second lead wires and returns to the other of the first and second lead wire, and wherein the heat-generating resistance element has a series meandering portions arranged in a circumferential direction of the tubular insulating element and extending in an axial direction of the tubular insulating substrate, one endmost meandering portion being connected to the first lead wire, another endmost meandering portion being connected to the second lead wire, the second lead wire being disposed between two adjacent ones of the meandering portions which are disposed between said two endmost meandering portions.

5. The tubular heater of claim 1, wherein the heat-generating resistance element is formed on an inner peripheral surface of the tubular insulating substrate, and the first and second lead wires are disposed on the inner peripheral surface of the tubular insulating substrate.

6. The tubular heater of claim 1, further including a dehumidifying agent incorporated in the tubular heater.

7. The tubular heater of claim 2, wherein the heat-generating resistance element is formed on an inner peripheral surface of the tubular insulating substrate, and the first and second lead wires are disposed on the inner peripheral surface of the tubular insulating substrate.

8. The tubular heater of claim 2, further including a dehumidifying agent incorporated in the tubular heater.

9. The tubular heater of claim 4, wherein the heat-generating resistance element is formed on an inner peripheral surface of the tubular insulating substrate, and the first and second lead wires are disposed on the inner peripheral surface of the tubular insulating substrate.

10. The tubular heater of claim 4, further including a dehumidifying agent incorporated in the tubular heater.

* * * * *